(12) United States Patent
Ma et al.

(10) Patent No.: US 11,836,062 B2
(45) Date of Patent: Dec. 5, 2023

(54) SYSTEM AND METHOD OF MANAGING ACOUSTICS OF INFORMATION HANDLING SYSTEMS

(71) Applicant: Dell Products L.P., Round Rock, TX (US)

(72) Inventors: Yuan David Ma, Austin, TX (US); Ivan Guerra, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 251 days.

(21) Appl. No.: 17/381,967

(22) Filed: Jul. 21, 2021

(65) Prior Publication Data

US 2023/0022881 A1 Jan. 26, 2023

(51) Int. Cl.
| | |
|---|---|
| G06F 11/30 | (2006.01) |
| G06F 1/20 | (2006.01) |
| G06F 1/32 | (2019.01) |
| G06F 1/3206 | (2019.01) |
| G06F 1/3231 | (2019.01) |
| G06F 1/3234 | (2019.01) |

(52) U.S. Cl.
CPC ............ *G06F 11/3062* (2013.01); *G06F 1/20* (2013.01); *G06F 1/206* (2013.01); *G06F 1/3206* (2013.01); *G06F 1/3231* (2013.01); *G06F 11/3051* (2013.01); *G06F 1/325* (2013.01)

(58) Field of Classification Search
CPC .......................... G06F 11/3062; G06F 11/3051
See application file for complete search history.

(56) References Cited

U.S. PATENT DOCUMENTS

| 6,134,667 A * | 10/2000 | Suzuki | G06F 1/206 |
| | | | 361/679.48 |
| 2012/0275610 A1* | 11/2012 | Lambert | G10L 25/48 |
| | | | 381/56 |
| 2013/0289792 A1* | 10/2013 | Cheng | G06F 1/206 |
| | | | 700/300 |
| 2014/0277750 A1* | 9/2014 | Artman | G05B 15/02 |
| | | | 700/275 |
| 2014/0277818 A1* | 9/2014 | Peterson | G06F 1/206 |
| | | | 700/300 |
| 2017/0269654 A1* | 9/2017 | Shabbir | G06F 13/4018 |

(Continued)

*Primary Examiner* — Jaweed A Abbaszadeh
*Assistant Examiner* — Cheri L Harrington
(74) *Attorney, Agent, or Firm* — McDermott Will & Emery LLP

(57) ABSTRACT

In one or more embodiments, one or more systems, one or more methods, and/or one or more processes may determine that an inventory of components of an information handling system (IHS) includes a first fan and an IHS card, which include a second fan; receive user input indicating a maximum acoustic sound pressure level (SPL); determine a first maximum fan speed for the first fan based at least on the maximum acoustic SPL; determine a first maximum power consumption for the IHS card and a second maximum fan speed for the second fan based at least on the maximum acoustic SPL; provide first configuration information, indicating the first maximum fan speed for the first fan, to a fan controller of the IHS; and provide second configuration information, indicating the first maximum power consumption and the second maximum fan speed for the second fan, to the IHS card.

16 Claims, 7 Drawing Sheets

(56) References Cited

U.S. PATENT DOCUMENTS

| | | | | |
|---|---|---|---|---|
| 2017/0273215 A1* | 9/2017 | Shabbir | ................... | G06F 1/203 |
| 2017/0336839 A1* | 11/2017 | Ho | ....................... | G05B 19/406 |
| 2018/0203493 A1* | 7/2018 | Han | ................... | H05K 7/20209 |
| 2018/0352681 A1* | 12/2018 | Shabbir | ................... | G06F 1/206 |
| 2020/0133358 A1* | 4/2020 | Mishra | ................. | G06V 10/774 |

\* cited by examiner

SYSTEM AND METHOD OF MANAGING ACOUSTICS OF INFORMATION HANDLING SYSTEMS

BACKGROUND

Field of the Disclosure

This disclosure relates generally to information handling systems and more particularly to managing acoustics of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may determine that an inventory of components of the information handling system includes at least a first fan and an information handling system card; may determine that the information handling system card includes at least a second fan; may receive first user input indicating a first maximum acoustic sound pressure level associated with operating the information handling system; may determine a first maximum power consumption for the information handling system card based at least on the first maximum acoustic sound pressure level; may determine a first maximum fan speed for the at least the first fan based at least on the first maximum acoustic sound pressure level; may determine a second maximum fan speed for the at least the second fan based at least on the first maximum acoustic sound pressure level; may provide first configuration information, which indicates the first maximum fan speed for the at least the first fan, to a fan controller of the information handling system; and may provide second configuration information, which indicates the first maximum power consumption and the second maximum fan speed for the at least the second fan, to the information handling system card. In one or more embodiments, the one or more systems, the one or more methods, and/or the one or more processes may further operate the at least the first fan at a first fan speed less than or equal to the first maximum fan speed. In one or more embodiments, the one or more systems, the one or more methods, and/or the one or more processes may further operate the at least the second fan at a second fan speed less than or equal to the second maximum fan speed.

In one or more embodiments, the one or more systems, the one or more methods, and/or the one or more processes may further determine that a calendar event has occurred. For example, in response to determining that the calendar event has occurred, the one or more systems, the one or more methods, and/or the one or more processes may further determine a second maximum acoustic sound pressure level associated with operating the information handling system based at least on the calendar event, in which the second maximum acoustic sound pressure level is less than the first maximum acoustic sound pressure. For instance, the one or more methods, and/or the one or more processes may further determine a second maximum power consumption for the information handling system card based at least on the second maximum acoustic sound pressure level; determine a third maximum fan speed for the at least the first fan based at least on the second maximum acoustic sound pressure level; determine a fourth maximum fan speed for the at least the second fan based at least on the first maximum acoustic sound pressure level; provide third configuration information, which indicates the third maximum fan speed for the at least the first fan, to the fan controller of the information handling system; and provide fourth configuration information, which indicates the second maximum power consumption and the fourth maximum fan speed for the at least the second fan, to the information handling system card.

In one or more embodiments, the calendar event may be associated with a length of time. For example, the one or more systems, the one or more methods, and/or the one or more processes may further determine that the length of time has passed; provide the first configuration information, which indicates the first maximum fan speed for the at least the first fan, to the fan controller of the information handling system; and provide the second configuration information, which indicates the first maximum power consumption and the second maximum fan speed for the at least the second fan, to the information handling system card.

In one or more embodiments, the one or more methods, and/or the one or more processes may further determine at least one of that a user is not present and that a headphone plug has been inserted into a headphone jack. For example, in response to determining the one of that the user is not present and that the headphone plug has been inserted into the headphone jack, the one or more methods, and/or the one or more processes may further determine a second maximum acoustic sound pressure level associated with operating the information handling system based at least on the calendar event, in which the second maximum acoustic sound pressure level is greater than the first maximum acoustic sound pressure level. For instance, provide determine a second maximum power consumption for the information handling system card based at least on the second maximum acoustic sound pressure level; determine a third maximum fan speed for the at least the first fan based at least on the second maximum acoustic sound pressure level; determine a fourth maximum fan speed for the at least the second fan based at least on the first maximum acoustic sound pressure level; provide third configuration information, which indicates the third maximum fan speed for the at least the first fan, to the fan controller of the information handling system; and provide fourth configuration information, which indicates the second maximum power consumption and the fourth maximum fan speed for the at least the second fan, to the information handling system card.

In one or more embodiments, after determining the at least one of that the user is not present and that the headphone plug has been inserted into the headphone jack, the one or more methods, and/or the one or more processes may further determine at least one of that the user is present and that the headphone plug has been removed from the headphone jack. For example, in response to determining the at least one of that the user is present and that the headphone plug has been removed from the headphone jack, the one or more methods, and/or the one or more processes may further: provide the first configuration information, which indicates the first maximum fan speed for the at least the first fan, to the fan controller of the information handling system; and provide the second configuration information, which indicates the first maximum power consumption and the second maximum fan speed for the at least the second fan, to the information handling system card.

In one or more embodiments, the one or more methods, and/or the one or more processes may further receive second user input indicating a second maximum acoustic sound pressure level associated with operating the information handling system; determine a second maximum power consumption for the information handling system card based at least on the second maximum acoustic sound pressure level; determine a third maximum fan speed for the at least the first fan based at least on the second maximum acoustic sound pressure level; determine a fourth maximum fan speed for the at least the second fan based at least on the first maximum acoustic sound pressure level; provide third configuration information, which indicates the third maximum fan speed for the at least the first fan, to the fan controller of the information handling system; and provide fourth configuration information, which indicates the second maximum power consumption and the fourth maximum fan speed for the at least the second fan, to the information handling system card.

In one or more embodiments, receiving the first user input may include receiving the first user input via a graphical user interface of an application that executes in an operating system context. For example, the one or more methods, and/or the one or more processes may further provide information associated with the first maximum acoustic sound pressure level to information handling system firmware of the information handling system via a management information exchange. In one instance, providing the first configuration information to the fan controller of the information handling system may include the information handling system firmware providing the first configuration information to the fan controller of the information handling system. In another instance, providing the second configuration information to the information handling system card may include the information handling system firmware providing the second configuration information to the information handling system card.

In one or more embodiments, the information handling system firmware may provide the first configuration information to the fan controller of the information handling system includes the information handling system firmware providing the first configuration information to an embedded controller of the information handling system, which provides the first configuration information to the fan controller of the information handling system.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
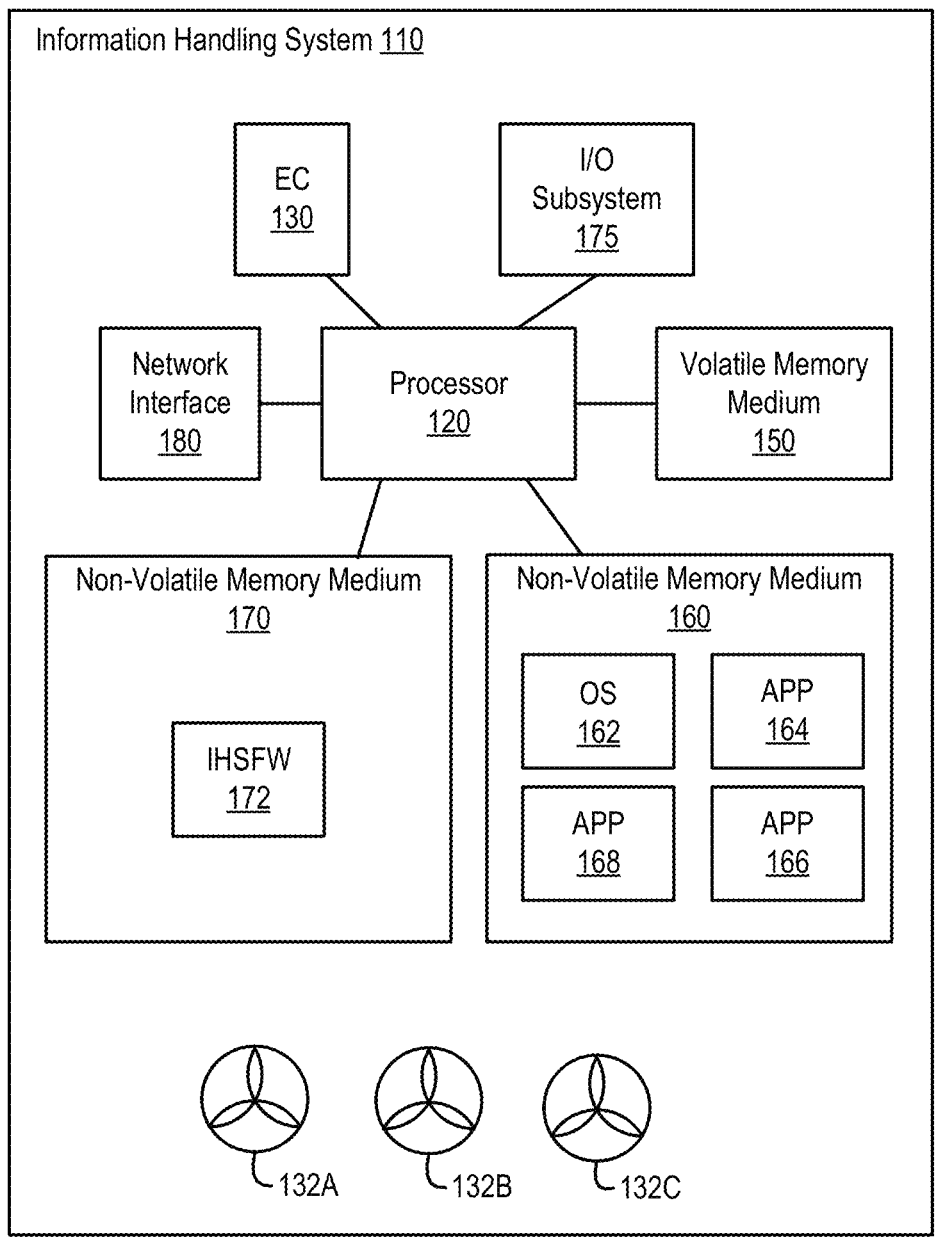
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, increasing numbers of components of information handling systems may cause acoustic noise associated with the information handling systems to increase. In one or more embodiments, decreasing sizes of housings of the information handling system may cause acoustic noise associated with the information handling systems to increase. In one or more embodiments, one or more fans of an information handling system may contribute to acoustic noise associated with the information handling system.

In one or more embodiments, an information handling system may be manufactured with one or more fans. For example, the information handling system may control the one or more fans. In one or more embodiments, one or more components that include one or more fans may be added to the information handling system. For example, the information handling system may control the fans of the one or more components that were added to the information handling system. For instance, the information handling system may control fans of a graphics card that was added to the information handling system.

In one or more embodiments, vendors of graphics cards may configure fan speed profiles based at least on one or more of card temperature, power consumption, and acoustic levels. For example, the vendors of graphics cards may configure fan speed profiles without user acoustic preferences. In one instance, first multiple users may prefer low acoustic noise levels. In another instance, second multiple users may not have a preference to any acoustic noise levels. As an example, the second multiple users may permit fan speeds that meet or exceed fan speed profiles configured by the vendors of the graphics cards. For instance, additional graphics processing may be achieved if the fan speeds exceed fan speed profiles configured by the vendors of the graphics cards.

In one or more embodiments, a user selectable thermal table (USTT) may permit a user to make tradeoffs between acoustics associated with an information handling system and performance associated with the information handling system. For example, the user may select from multiple modes. For instance, the modes may include a quiet mode, an optimized mode, and a performance mode, among others. As an example, the quiet mode may be associated with an acoustically sensitive user that may sacrifice performance of the information handling system for a quietest possible operation of an information handling system. As a second example, the optimized mode may be associated with a user that wants to increase performance of an information handling system but is also an acoustically sensitive user. As another example, the performance mode may be associated with a user that may not mind noise levels associated with an information handling system and wants as much performance from the information handling system as possible.

In one or more embodiments, the multiple modes may be utilized with one or more information handling system cards that may be added to an information handling system. For example, the multiple modes may be utilized to control fans speed of the information handling system one or more cards that may be added to the information handling system and/or to control power consumption of the one or more information handling system cards that may be added to the information handling system. In one instance, the quiet mode may decrease a total graphics power (TGP), but not decrease the TGP such that performance of a graphics card is severely throttled down. In a second instance, the optimized mode may implement a balance between a TGP and acoustic noise levels associated with the graphics card. In another instance, the performance mode may increase a TGP and/or may increase a fan speed associated with the graphics card to improve performance of the graphics card.

In one or more embodiments, a mode of the multiple modes may be with one or more of a fan speed, an average TGP, an average processor frequency, and an average sound pressure level (SPL), among others. In one example, the quiet mode may be associated with one or more of a fan speed of 1950 revolutions per minute (RPM), an average TGP of 222 Watts, an average processor frequency of 1151 MHz, and a first SPL, among others. In a second example, the optimized mode may be associated with one or more of a fan speed of 2420 RPM, an average TGP of 259 Watts, an average processor frequency of 1276 MHz, and a second SPL, among others. For instance, the second SPL may be greater than the first SPL. In another example, the performance mode may be associated with one or more of a fan speed of 2915 RPM, an average TGP of 290 Watts, an average processor frequency of 1374 MHz, and a third SPL, among others. For instance, the third SPL may be greater than the second SPL.

In one or more embodiments, a SPL may be a pressure level of a sound, which may be measured in decibels (dB). For example, a SPL may be equal to $20 \times \mathrm{Log}_{10}$ of a ratio of a root mean square (RMS) of sound pressure to a reference of sound pressure. For instance, the reference of sound pressure in air may be $2 \times 10^{-5}$ Newtons per square meter ($N/m^2$) or 0.00002 Pascals (Pa). In one or more embodiments, altering a fan speed of a graphics card or a TGP of the graphics card may produce differences in sound pressure levels produced by the information handling system and/or the graphics card can be achieved. In one or more embodiments, altering the TGP of the graphics card may alter one or more performances of the graphics card. For example, a reduction of the TGP of the graphics card may reduce a SPL produced by the graphics card and/or the information handling system. In one or more embodiments, a SPL associated with the quiet mode may be reduced by forty percent (40%) from the optimized mode. For example, the optimized mode may be associated with a ten percent (10%) decrease, from the optimized mode, in a frequency of a graphics processing unit. In one or more embodiments, a SPL associated with the performance mode may be increased by forty-six percent (46%) from the optimized mode. For example, the performance mode may be associated with an eight percent (8%) increase, from the optimized mode, in a frequency of a graphics processing unit.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, an embedded controller (EC) 130, a volatile memory medium 150, non-volatile memory media 160 and 170, an I/O subsystem 175, and a network interface 180. As illustrated, EC 130, volatile memory medium 150, non-volatile memory media 160 and 170, I/O subsystem 175, and network interface 180 may be communicatively coupled to processor 120.

In one or more embodiments, one or more of EC 130, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of EC 130, volatile memory medium 150, non-volatile memory media 160 and 170, I/O subsystem 175, and network interface 180 may be communicatively coupled to processor 120 via one or more PCI-Express (PCIe) root complexes. In another example, one or more of EC 130, I/O subsystem 175, and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

In one or more embodiments, EC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, EC 130 may be or include a microcontroller. For example, the microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 130 may be or include an application processor. In one example, EC 130 may be or include an ARM Cortex-A processor. In another example, EC 130 may be or include an Intel Atom processor. In one or more embodiments, EC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

In one or more embodiments, IHS 110 may include one or more fans. For example, information handling system 110 may include fans 132A-132C. Although information handling system 110 is illustrated as including fans 132A-132C, information handling system 110 may include any number of fans 132, according to one or more embodiments. In one or more embodiments, EC 130 may control one or more of fans 132A-132C. For example, EC 130 may provide control information to a fan controller (not specifically illustrated), which may control one or more of fans 132A-132C. For instance, EC 130 may provide control information to the fan controller via a SMBus. In one or more embodiments, a fan 132 may generate one or more sounds as fan 132 operates to move air. For example, the one or more sounds the fan 132 generates may be quantified as one or more sound pressure levels.

Figure 1B:
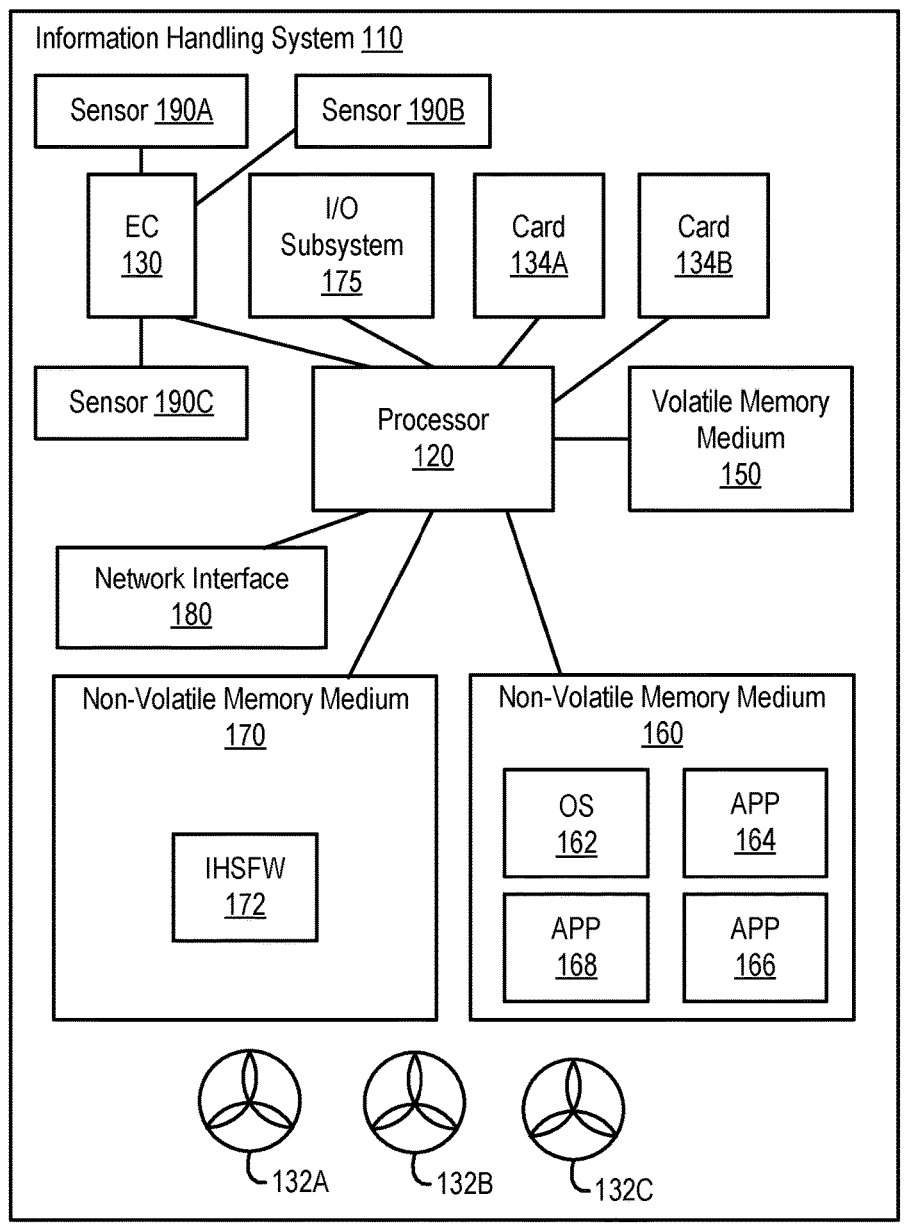
FIG. 1B illustrates a second example of an information handling system, according to one or more embodiments.
Figure 1B:
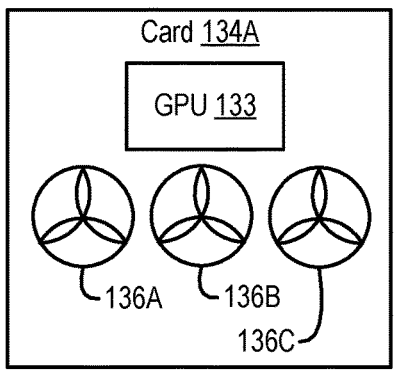
Figure 1B:
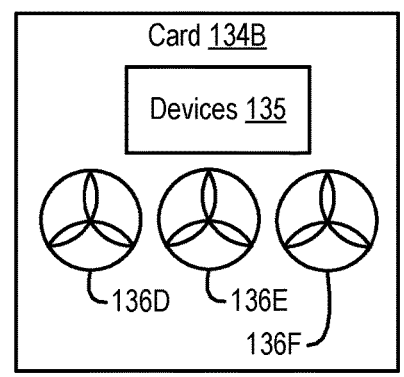

Turning now to FIG. 1B, a second example of an information handling system is illustrated, according to one or more embodiments. In one or more embodiments, one or more information handling system cards may be installed in IHS 110. For example, information handling system cards 134A and 134B may be installed in IHS 110. Although FIG. 1B illustrates two information handling system cards, any number of information handling system cards 134 may be installed in IHS 110, according to one or more embodiments.

In one or more embodiments, an information handling system card 134 may be or may include a PCIe information handling system card. In one or more embodiments, information handling system card 134A may be or may include a graphics card. For example, information handling system card 134A may include a graphics processing unit (GPU) 133. In one or more embodiments, information handling system card 134B may include devices 135. For example, devices 135 may include one or more processors, one or more storage devices (e.g., one or more memory media), one or more field programmable gate arrays (FPGAs), and/or one or more complex logic devices (CPLDs), among others.

In one or more embodiments, an information handling system card 134 may include one or more fans. In one example, information handling system card 134A may include fans 136A-136C. Although information handling system card 134A is illustrated as including fans 136A-136C, information handling system card 134A may include any number of fans 136, according to one or more embodiments. In another example, information handling system card 134A may include fans 136D-136F. Although information handling system card 134B is illustrated as including fans 136D-136F, information handling system card 134B may include any number of fans 136, according to one or more embodiments.

In one or more embodiments, a fan 136 may move air to remove heat from (e.g., to cool) one or more portions of an information handling system card 134. For example, temperature values associated with the one or more portions may increase as information handling system card 134 operates and/or functions. For instance, one or more components of information handling system card 134 may generate heat as information handling system card 134 operates and/or functions. As an example, GPU 133 may generate heat as information handling system card 134A operates and/or functions. As another example, devices 135 may generate heat as information handling system card 134B operates and/or functions. In one or more embodiments, a fan 136 may generate one or more sounds as fan 136 operates to move air. For example, the one or more sounds the fan 136 generates may be quantified as one or more sound pressure levels.

In one or more embodiments, an information handling system card 134 may provide information associated with one or more of a power consumption value of information handling system card 134, a temperature value (e.g., a temperature value associated with GPU 133, a temperature value associated with devices 135, etc.), and a speed value of a fan 136 of information handling system card 134, among others. For example, information handling system card 134 may provide the information to EC 130. For instance, information handling system card 134 may provide the information to EC 130 via a bus. As an example, information handling system card 134 may provide the information to EC 130 via a SMBus. In one or more embodiments, EC 130 may receive the information from information handling system card 134.

In one or more embodiments, IHS 110 may include one or more sensors. For example, IHS 110 may include sensors 190A-190C. Although IHS 110 is shown with sensors 190A-190C, IHS 110 may include any number of sensors 190, according to one or more embodiments. For example, IHS 110 may include any number of sensors 190 at any number of respective physical locations within IHS 110. In one or more embodiments, sensors 190A-190C may be communicatively coupled to EC 130. For example, EC 190 may receive information from sensors 190A-190C.

In one or more embodiments, a sensor 190 may transform one or more physical phenomena into one or more signals. In one example, a sensor 190 may transform physical one or more phenomena into one or more analog signals and may provide the one or more analog signals to EC 130. For instance, EC 130 may receive the one or more analog signals. In another example, a sensor 190 may transform physical one or more phenomena into one or more digital signals and may provide the one or more digital signals to EC 130. For instance, EC 130 may receive the one or more digital signals. In one or more embodiments, a sensor 190 may provide temperature values to EC 130 via the one or more signals. In one or more embodiments, a sensor 190 may include a microphone. For example, the microphone may transform one or more sounds into the one or more signals. For instance, EC 130 may determine one or more sound pressure levels based at least on the one or more signals from the microphone.

Figure 2:
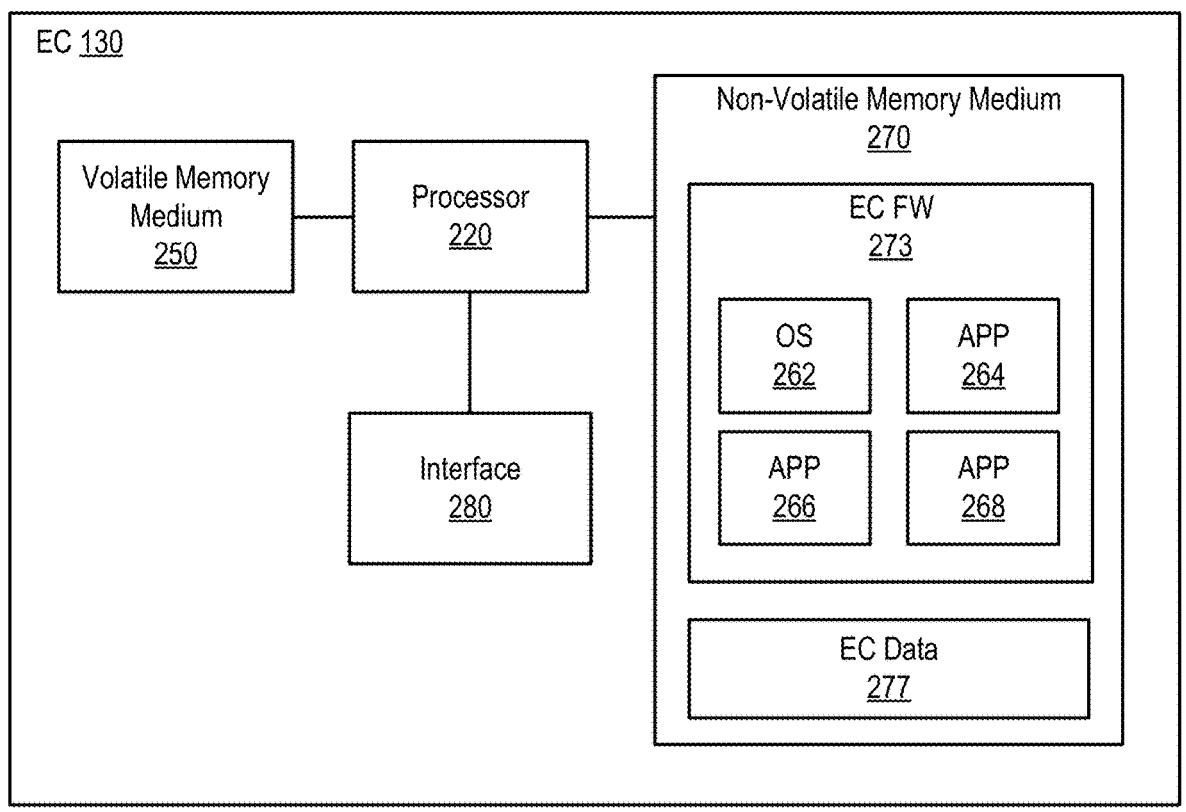
FIG. 2 illustrates an example of an embedded controller, according to one or more embodiments.

Turning now to FIG. 2, an example of an embedded controller is illustrated, according to one or more embodiments. As shown, EC 130 may include a processor 220, a volatile memory medium 250, a non-volatile memory medium 270, and an interface 280. As illustrated, non-volatile memory medium 270 may include an EC firmware (FW) 273, which may include an OS 262 and APPs 264-268, and may include EC data 277. In one example, OS 262 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 262 may be or include an Unix-like operating system. For instance, the Unix-like operating system may be or include LINUX®, FREEBSD®, NETBSD®, OpenBSD, Minix, Xinu, or Darwin, among others. In another example, OS 262 may be or include a portable operating system interface (POSIX) compliant operating system.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable EC 130 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, at least a portion of one or more flowcharts, one or more methods, and/or at least a portion of one or more processes described herein. For example, non-volatile memory medium 270 and/or volatile memory medium 250 may store instructions that may be executable in accordance with at least a portion of one or more systems, at least a portion of one or more flowcharts, at least a portion of one or more methods, and/or at least a portion of one or more processes described herein. In one or more embodiments, processor 220 may execute instructions in accordance with at least a portion of one or more of systems, flowcharts, at least a portion of one or more methods, and/or at least a portion of one or more processes described herein. For example, non-volatile memory medium 270 and/or volatile memory medium 250 may store instructions that may be executable in accordance with at least a portion of one or more of systems, at least a portion of one or more flowcharts, at least a portion of one or more methods, and/or at least a portion of one or more processes described herein. In one or more embodiments, processor 220 may utilize EC data 277. In one example, processor 220 may utilize EC data 277 via non-volatile memory medium 270. In another example, one or more portions of EC data 277 may be transferred to volatile memory medium 250, and processor 220 may utilize EC data 277 via volatile memory medium 250.

Figure 3A:
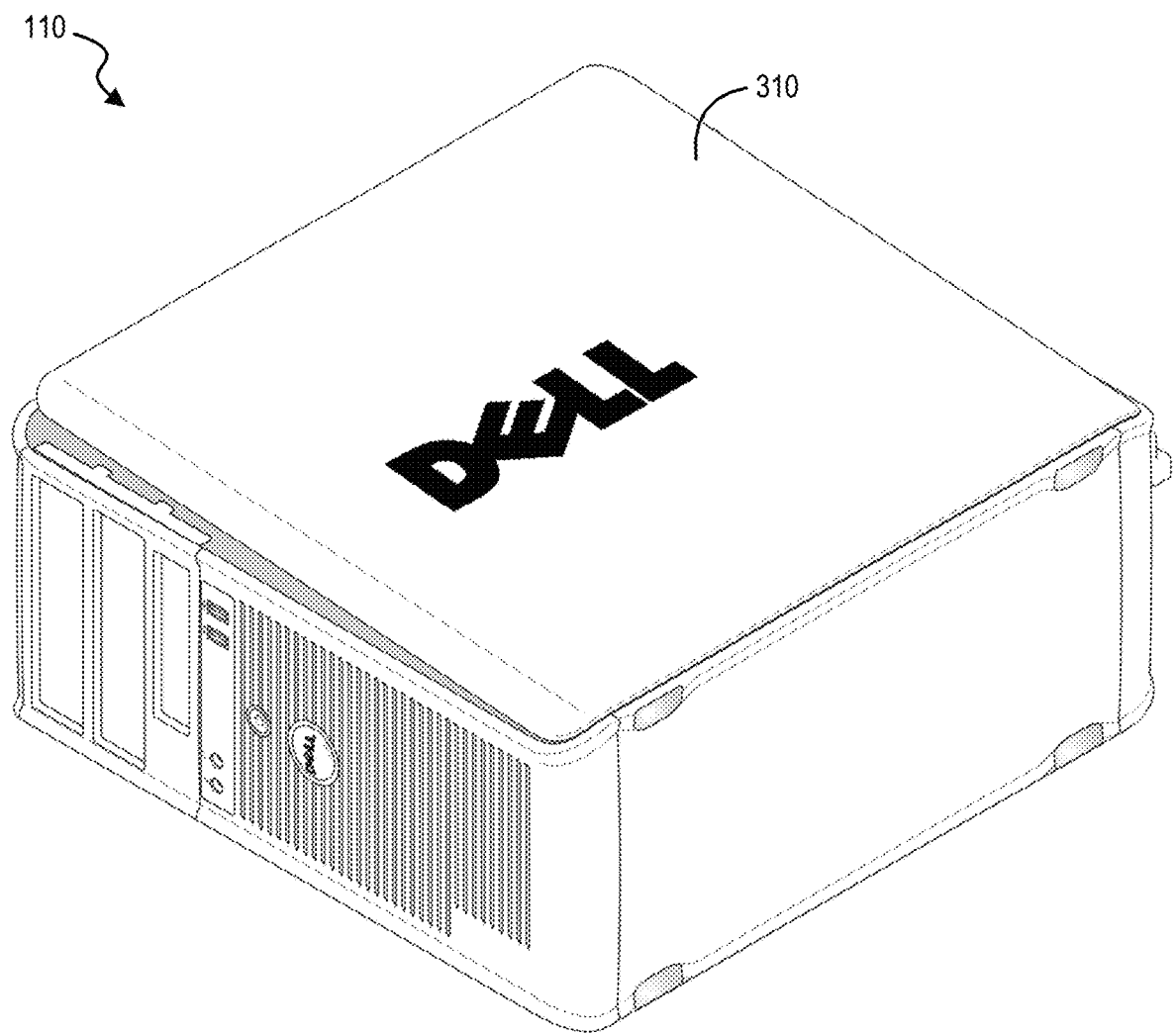
FIG. 3A illustrates another example of an information handling system, according to one or more embodiments.

Turning now to FIG. 3A, another example of an information handling system is illustrated, according to one or more embodiments. In one or more embodiments, IHS 110 may include a housing 310. For example, a portion of housing 310 may be removed and/or set aside to install an information handling system card 134.

Figure 3B:
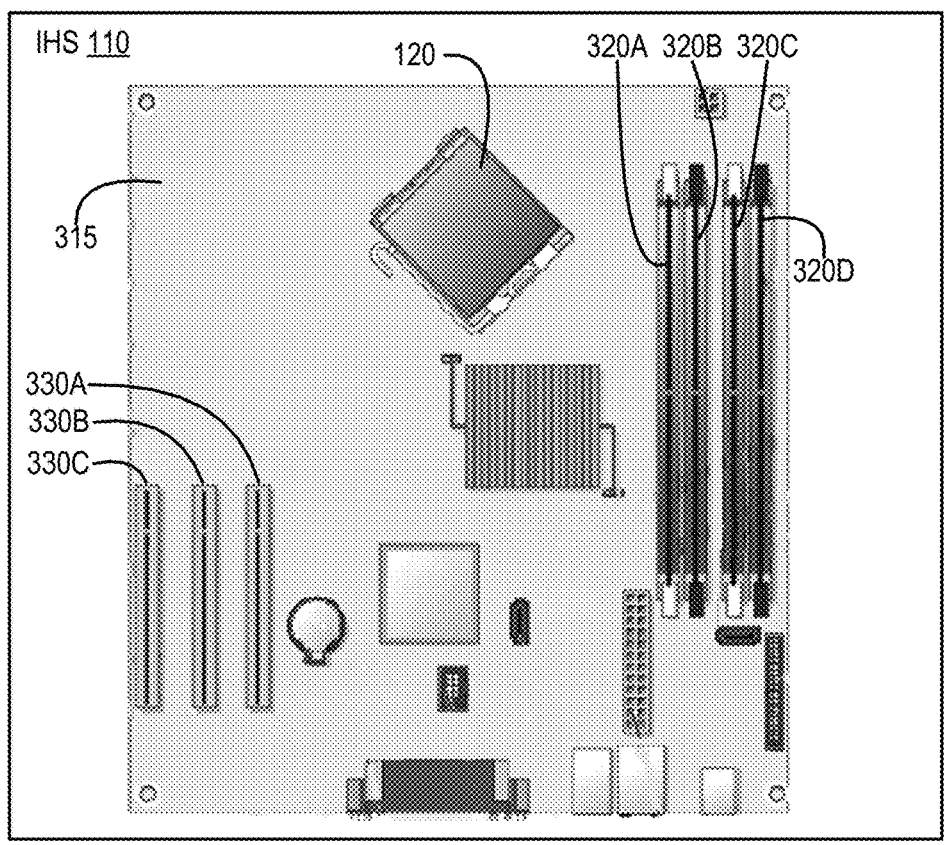
FIG. 3B illustrates an example of a motherboard of an information handling system, according to one or more embodiments.

Turning now to FIG. 3B, an example of a motherboard of an information handling system is illustrated, according to one or more embodiments. In one or more embodiments, IHS 110 may include a motherboard 315. For example, processor 120 may be installed on motherboard 315. In one or more embodiments, motherboard 315 may include one or more memory ports. For example, motherboard 315 may include memory ports 320A-320D. For instance, a dual in-line memory module (DIMM) may be installed in a memory port 320. In one or more embodiments, one or more dual in-line memory modules (DIMMs) may implement volatile memory medium 150. In one or more embodiments, a memory port may be called a memory slot. Although motherboard 315 is illustrated with memory ports 320A-320D, motherboard 315 may include any number of memory ports 320, according to one or more embodiments.

Figure 3C:
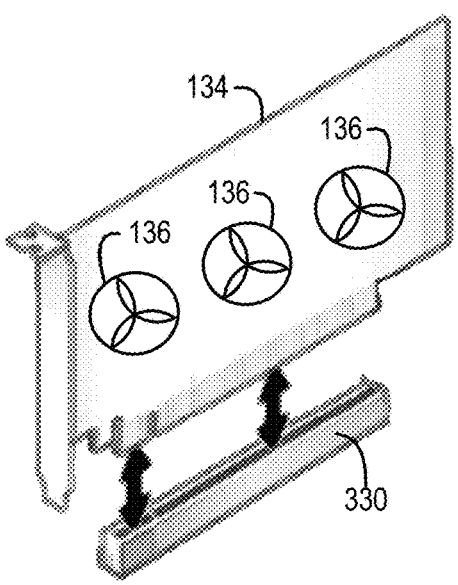
FIG. 3C illustrates an example of an information handling system and an information handling system card port, according to one or more embodiments.

In one or more embodiments, motherboard 315 may include one or more information handling system card ports. For example, motherboard 315 may include information handling system card ports 330A-330C. For instance, an information handling system card 134 may be installed in or removed from an information handling system card port 330, as illustrated in FIG. 3C. In one or more embodiments, an information handling system card port 330 may be communicatively coupled to processor 120. For example, an information handling system card port 330 may be communicatively coupled to processor 120 via a PCIe coupling. For instance, an information handling system card port 330 may be communicatively coupled to processor 120 via a PCIe root complex and/or a PCIe switch. Although motherboard 315 is illustrated with information handling system card ports 330A-330C, motherboard 315 may include any number of information handling system card ports 330, according to one or more embodiments. In one or more embodiments, an information handling system card port may be called an information handling system card slot.

In one or more embodiments, a user (e.g., an end user, a customer, an administrator, etc.) may install an information handling system card 134 in an information handling system card port 330. In one or more embodiments, an original equipment manufacturer (OEM) of IHS 110 may install an information handling system card 134 in an information handling system card port 330. For example, the user (e.g., the end user, the customer, etc.) may receive IHS 110 with an information handling system card 134 already installed in an information handling system card port 330.

Figure 4A:
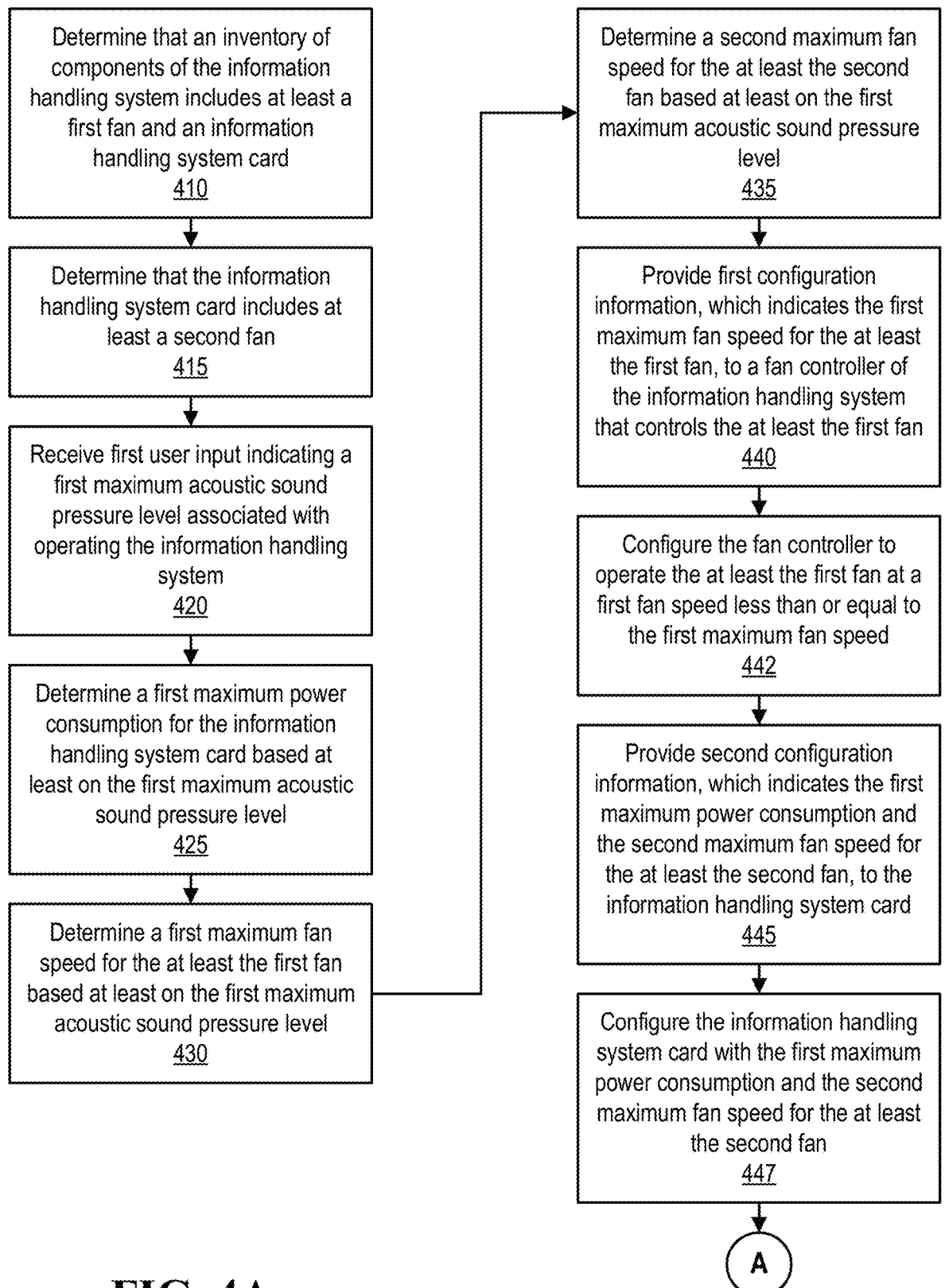
FIGS. 4A and 4B illustrate an example of a method of operating an information handling system, according to one or more embodiments.
Figure 4B:
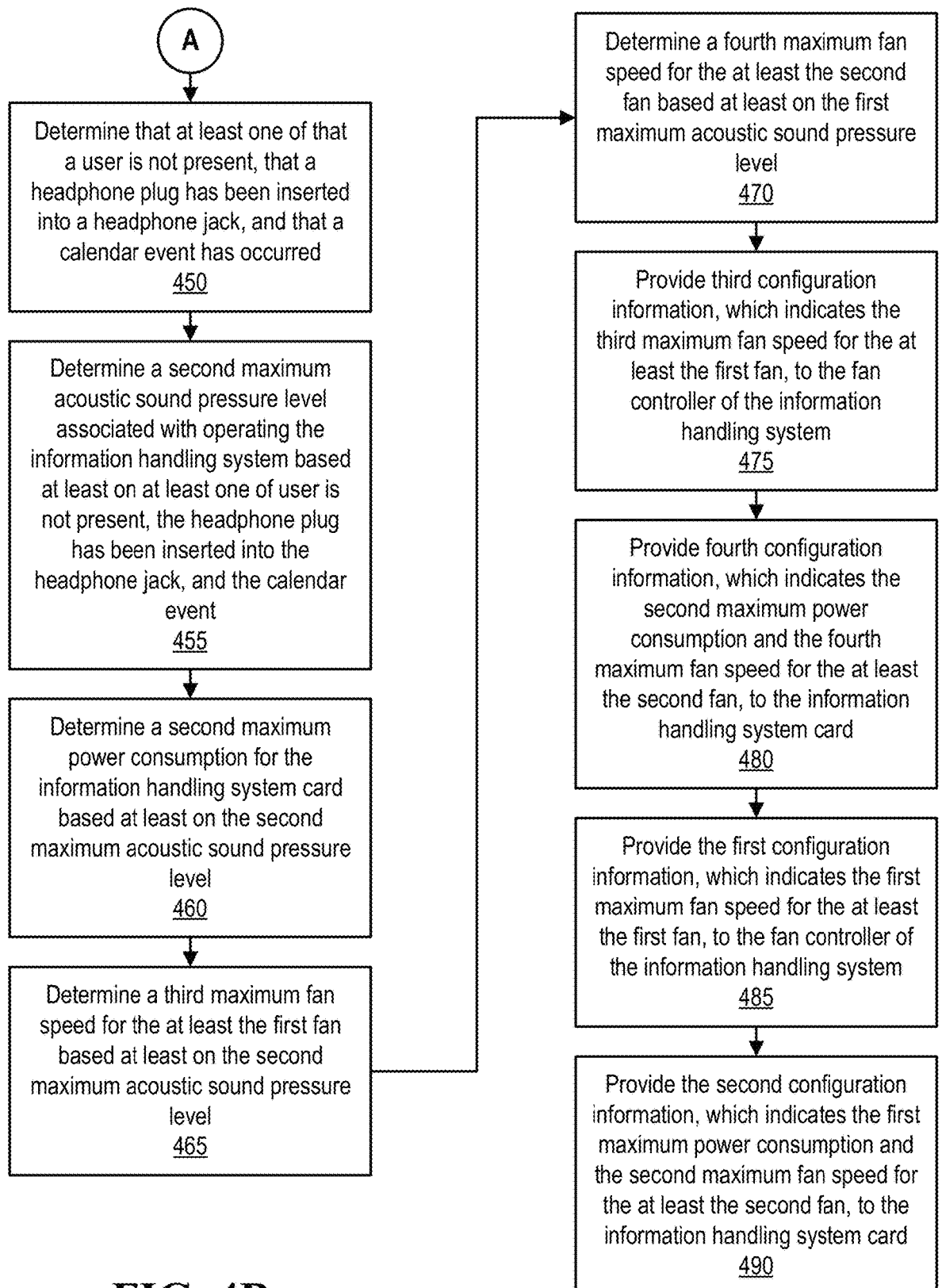

Turning now to FIGS. 4A and 4B, an example of a method of operating an information handling system is illustrated, according to one or more embodiments. At 410, an inventory of components of an information handling system may be determined to include at least a first fan and an information handling system card. For example, processor 120 may determine that an inventory of components of IHS 110 includes at least a first fan 132 and an information handling system card 134. At 415, it may be determined that the information handling system card includes at least a second fan. For example, processor 120 may determine that information handling system card 134 includes at least a second fan 136.

At 420, first user input indicating a first maximum acoustic sound pressure level associated with operating the information handling system may be received. For example, processor 120 may receive first user input indicating a first maximum acoustic sound pressure level associated with operating IHS 110. In one or more embodiments, an acoustic sound pressure level may include a sound pressure level that a human can hear. For example, a human may hear sound pressure level associated with sounds in a range of 20 Hz to 20 kHz. In one or more embodiments, the first maximum acoustic sound pressure level associated with operating IHS 110 may be associated with a distance from IHS 110. For example, the distance from IHS 110 may be ten feet (10 ft) or less.

In one or more embodiments, processor 120 may receive the first user input via a graphical user interface of an application that executes in an operating system context. For example, processor 120 may provide information associated with the first maximum acoustic sound pressure level to IHSFW 172 via a management information exchange. For example, IHSFW 172 may provide the information associated with the first maximum acoustic sound pressure level to BMC 130. As an example, BMC 130 may provide first configuration information, based at least on the information associated with the first maximum acoustic sound pressure level, to a fan controller of IHS 110. As another example, BMC 130 may provide second configuration information, based at least on the information associated with the first maximum acoustic sound pressure level, to card 134.

At 425, a first maximum power consumption for the information handling system card may be determined based at least on the first maximum acoustic sound pressure level. For example, EC 130 may determine a first maximum power consumption for information handling system card 134 based at least on the first maximum acoustic sound pressure level. In one or more embodiments, the first maximum power consumption for the information handling system card may be determined further based at least on one or more temperature values associated with the one or more portions of information handling system card 134 (e.g., GPU 133, devices 135, etc.), a total graphics power, one or more temperature values associated with IHS 110, a current acoustic sound pressure level associated with information handling system card 134, a current acoustic sound pressure level associated with IHS 110, and/or a maximum operating temperature associated with information handling system card 134, among others. For example, the one or more of temperature values associated with IHS 110, the current acoustic sound pressure level associated with information handling system card 134, and/or the current acoustic sound pressure level associated with IHS 110, among others, may be determined via one or more of sensors 190.

At 430, a first maximum fan speed may be determined for the at least the first fan based at least on the first maximum acoustic sound pressure level. For example, EC 130 may determine a first maximum fan speed for fan 132 based at least on the first maximum acoustic sound pressure level. In one or more embodiments, the first maximum fan speed may be determined further based at least on one or more temperature values associated with the one or more portions of information handling system card 134 (e.g., GPU 133, devices 135, etc.), a total graphics power, one or more temperature values associated with IHS 110, a current acoustic sound pressure level associated with information handling system card 134, a current acoustic sound pressure level associated with IHS 110, and/or a maximum operating temperature associated with information handling system card 134, among others. For example, the one or more of temperature values associated with IHS 110, the current acoustic sound pressure level associated with information handling system card 134, and/or the current acoustic sound pressure level associated with IHS 110, among others, may be determined via one or more of sensors 190.

At 435, a second maximum fan speed may be determined for the at least the second fan based at least on the first maximum acoustic sound pressure level. For example, EC 130 determine a second maximum fan speed for fan 136 based at least on the first maximum acoustic sound pressure level. In one or more embodiments, the second maximum fan speed may be determined further based at least on one or more temperature values associated with the one or more portions of information handling system card 134 (e.g., GPU 133, devices 135, etc.), a total graphics power, one or more temperature values associated with IHS 110, a current acoustic sound pressure level associated with information handling system card 134, a current acoustic sound pressure level associated with IHS 110, and/or a maximum operating temperature associated with information handling system card 134, among others. For example, the one or more of temperature values associated with IHS 110, the current acoustic sound pressure level associated with information handling system card 134, and/or the current acoustic sound pressure level associated with IHS 110, among others, may be determined via one or more of sensors 190.

At 440, first configuration information, which indicates the first maximum fan speed for the at least the first fan, may be provided to a fan controller of the information handling system that controls the at least the first fan. For example, EC 130 may provide first configuration information, which indicates the first maximum fan speed for fan 132, to a fan controller of IHS 110 that controls fan 132.

At 442, the fan controller may be configured to operate the at least the first fan at a first fan speed less than or equal to the first maximum fan speed. For example, EC 130 may configure the fan controller to operate the at least the first fan at a first fan speed less than or equal to the first maximum fan speed. For instance, EC 130 may configure the fan controller to operate the at least the first fan at a first fan speed less than or equal to the first maximum fan speed based at least on the first configuration information. In one or more embodiments, fan 132 may be operated a first fan speed less than or equal to the first maximum fan speed.

At 445, second configuration information, which indicates the first maximum power consumption and the second maximum fan speed for the at least the second fan, may be provided to the information handling system card. For example, EC 130 may provide second configuration information, which indicates the first maximum power consumption and the second maximum fan speed for the at least the second fan, to information handling system card 134.

At 447, the information handling system card may be configured with the first maximum power consumption and the second maximum fan speed for the at least the second fan. For example, EC 130 may configure information handling system card 134 with the first maximum power consumption and the second maximum fan speed for second fan 136. For instance, EC 130 may configure information handling system card 134 with the first maximum power consumption and the second maximum fan speed for second fan 136 based at least on the second configuration information. In one or more embodiments, fan 136 may be operated at a second fan speed less than or equal to the second maximum fan speed. For example, information handling system card 134 may be configured to operate fan 136 at a second fan speed less than or equal to the second maximum fan speed.

At 450, it may be determined at least one of that a user is not present, that a headphone plug has been inserted into a headphone jack, and that a calendar event has occurred. For example, processor 120 may determine at least one of that a user is not present, that a headphone plug has been inserted into a headphone jack, and that a calendar event has occurred. In one or more embodiments, IHS 110 may include the headphone jack. In one or more embodiments, a sound device communicatively coupled to IHS 110 may include the headphone jack. In one example, the sound device may be communicatively coupled to IHS 110 in a wired fashion. For instance, the sound device may include a USB sound device (e.g., a USB sound card) communicatively coupled to IHS 110. In another example, the sound device may be communicatively coupled to IHS 110 in a wireless fashion. For instance, the sound device may include a Bluetooth sound device (communicatively coupled to IHS 110.

At 455, a second maximum acoustic sound pressure level associated with operating the information handling system may be determined based at least on at least one of that user is not present, that the headphone plug has been inserted into the headphone jack, and that the calendar event occurred. In one example, processor 120 may determine a second maximum acoustic sound pressure level associated with operating the information handling system based at least on at least one of user is not present, the headphone plug has been inserted into the headphone jack, and the calendar event. In another example, EC 130 may determine a second maximum acoustic sound pressure level associated with operating the information handling system based at least on at least one of user is not present, the headphone plug has been inserted into the headphone jack, and the calendar event. In one or more embodiments, when it is determined that that user is not present or that the headphone plug has been inserted into the headphone jack, the second maximum acoustic sound pressure level may be greater than the first maximum acoustic sound pressure level.

In one or more embodiments, when it is determined that that the calendar event has occurred, the second maximum acoustic sound pressure level may be less than the first maximum acoustic sound pressure level. In one or more embodiments, the second maximum acoustic sound pressure level associated with operating IHS 110 may be associated with the distance from IHS 110. For example, the distance from IHS 110 may be ten feet (10 ft) or less. In one or more embodiments, determining the second maximum acoustic sound pressure level associated with operating the information handling system based at least on at least one of user is not present, the headphone plug has been inserted into the headphone jack, and the calendar event may be performed in response to determining that the at least one of that the user is not present, that the headphone plug has been inserted into the headphone jack, and that the calendar event has occurred.

At 460, a second maximum power consumption for the information handling system card may be determined based at least on the second maximum acoustic sound pressure level. In one example, processor 120 may determine a second maximum power consumption for information handling system card 134 based at least on the second maximum acoustic sound pressure level. In another example, EC 130 may determine a second maximum power consumption for information handling system card 134 based at least on the second maximum acoustic sound pressure level. In one or more embodiments, the second maximum power consumption for the information handling system card may be determined further based at least on one or more temperature values associated with the one or more portions of information handling system card 134 (e.g., GPU 133, devices 135, etc.), a total graphics power, one or more temperature values associated with IHS 110, a current acoustic sound pressure level associated with information handling system card 134, a current acoustic sound pressure level associated with IHS 110, and/or a maximum operating temperature associated with information handling system card 134, among others. For example, the one or more of temperature values associated with IHS 110, the current acoustic sound pressure level associated with information handling system card 134, and/or the current acoustic sound pressure level associated with IHS 110, among others, may be determined via one or more of sensors 190.

At 465, a third maximum fan speed for the at least the first fan may be determined based at least on the second maximum acoustic sound pressure level. In one example, processor 120 may determine a third maximum fan speed for fan 132 based at least on the second maximum acoustic sound pressure level. In another example, EC 130 may determine a third maximum fan speed for fan 132 based at least on the second maximum acoustic sound pressure level. In one or more embodiments, the third maximum fan speed may be determined further based at least on one or more temperature values associated with the one or more portions of information handling system card 134 (e.g., GPU 133, devices 135, etc.), a total graphics power, one or more temperature values associated with IHS 110, a current acoustic sound pressure level associated with information handling system card 134, a current acoustic sound pressure level associated with IHS 110, and/or a maximum operating temperature associated with information handling system card 134, among others. For example, the one or more of temperature values associated with IHS 110, the current acoustic sound pressure level associated with information handling system card 134, and/or the current acoustic sound pressure level associated with IHS 110, among others, may be determined via one or more of sensors 190.

At 470, a fourth maximum fan speed for the at least the second fan may be determined based at least on the second maximum acoustic sound pressure level. In one example, processor 120 may determine a fourth maximum fan speed for fan 136 based at least on the second maximum acoustic sound pressure level. In another example, EC 130 may determine a fourth maximum fan speed for fan 136 based at least on the second maximum acoustic sound pressure level. In one or more embodiments, the fourth maximum fan speed may be determined further based at least on one or more temperature values associated with the one or more portions of information handling system card 134 (e.g., GPU 133, devices 135, etc.), a total graphics power, one or more temperature values associated with IHS 110, a current acoustic sound pressure level associated with information handling system card 134, a current acoustic sound pressure level associated with IHS 110, and/or a maximum operating temperature associated with information handling system card 134, among others. For example, the one or more of temperature values associated with IHS 110, the current acoustic sound pressure level associated with information handling system card 134, and/or the current acoustic sound pressure level associated with IHS 110, among others, may be determined via one or more of sensors 190.

At 475, third configuration information, which indicates the third maximum fan speed for the at least the first fan, may be provided to the fan controller of the information handling system. In one example, processor 120 may provide third configuration information, which indicates the third maximum fan speed for fan 132, to the fan controller of IHS 110. In another example, EC 130 may provide third configuration information, which indicates the third maximum fan speed for fan 132, to the fan controller of IHS 110. In one or more embodiments, the fan controller of the information handling system may be configured with third configuration information. In one example, EC 130 may configure the fan controller of the information handling system may be configured with third configuration information. In another example, processor 120 may configure the fan controller of the information handling system may be configured with third configuration information.

At 480, fourth configuration information, which indicates the second maximum power consumption and the fourth maximum fan speed for the at least the second fan, may be provided to the information handling system card. In one example, processor 120 may provide fourth configuration information, which indicates the second maximum power consumption and the fourth maximum fan speed for fan 136, to information handling system card 134. In another example, EC 130 may provide fourth configuration information, which indicates the second maximum power consumption and the fourth maximum fan speed for fan 136, to information handling system card 134. In one or more embodiments, the information handling system card may be configured with the fourth configuration information. In one example, EC 130 may configure information handling system card 134 with the fourth configuration information. In another example, processor 120 may configure information handling system card 134 with the fourth configuration information.

At 485, the first configuration information, which indicates the first maximum fan speed for the at least the first fan, may be provided to the fan controller of the information handling system. For example, EC 130 may provide the first configuration information, which indicates the first maximum fan speed for fan 132, to the fan controller of IHS 110. In one or more embodiments, the fan controller of the information handling system may be configured with the first configuration information. For example, EC 130 may configure the fan controller of IHS 110. For instance, EC 130 may configure the fan controller of IHS 110 to operate fan 132 to operate at the first maximum fan speed or less than the first maximum fan speed. For instance, fan 132 to may operate at the first maximum fan speed or less than the first maximum fan speed.

At 490, the second configuration information, which indicates the first maximum power consumption and the second maximum fan speed for the at least the second fan, may be provided to the information handling system card. For example, EC 130 may provide the second configuration information, which indicates the first maximum power consumption and the second maximum fan speed for fan 136, to information handling system card 134. In one or more embodiments, the information handling system card may be configured with the second configuration information. For example, EC 130 may configure information handling system card 134 with the second configuration information. For instance, EC 130 may configure information handling system card 134 with the first maximum power consumption and the second maximum fan speed for fan 136, based at least on the second configuration information.

In one or more embodiments, the calendar event may be associated with a length of time. For example, it may be determined that the length of time has passed. For instance, method elements 485 and 490 may be performed in response to determining that the length of time has passed. In one or more embodiments, it may be determined that at least one of the user is present and the headphone plug has been removed from the headphone jack. For example, method elements 485 and 490 may be performed in response to determining that at least one of the user is present and the headphone plug has been removed from the headphone jack.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
a processor; and
an embedded controller coupled to the processor;
wherein the processor is configured to:
  determine that an inventory of components of the information handling system includes at least a first fan and an information handling system card;
  determine whether a headphone plug has been inserted into a headphone jack of the information handling system;
  determine that the information handling system card includes at least a second fan; and
  receive first user input indicating a first maximum acoustic sound pressure level associated with operating the information handling system; and
in response to the processor determining that the headphone plug is not inserted into the headphone jack:
  the embedded controller is configured to:
    determine a first maximum power consumption for the information handling system card based at least on the first maximum acoustic sound pressure level, a current acoustic sound pressure level associated with the second fan of the information handling system card, and a current acoustic sound pressure level associated with the first fan of the information handling system at a sensor spaced-apart from the information handling system card;
    determine a first maximum fan speed for the at least the first fan based at least on the first maximum acoustic sound pressure level;
    determine a second maximum fan speed for the at least the second fan based at least on the first maximum acoustic sound pressure level;
    provide first configuration information, which indicates the first maximum fan speed for the at least the first fan, to a fan controller of the information handling system that controls the at least the first fan; and provide second configuration information, which indicates the first maximum power consumption and the second maximum fan speed for the at least the second fan, to the information handling system card;
the fan controller configured to control a fan speed of the first fan based on the first configuration information;
the information handling system card configured to control a fan speed of the second fan based on the second configuration information;
in response to the processor determining that the headphone plug is inserted into the headphone jack:
the embedded controller is configured to:
determine a second maximum acoustic sound pressure level associated with operating the information handling system, wherein the second maximum acoustic sound pressure level is greater than the first maximum acoustic sound pressure level;
determine a second maximum power consumption for the information handling system card based at least on the second maximum acoustic sound pressure level, the current acoustic sound pressure level associated with the second fan of the information handling system card, and the current acoustic sound pressure level associated with the first fan of the information handling system at the sensor spaced-apart from the information handling system card;
determine a third maximum fan speed for the at least the first fan based at least on the second maximum acoustic sound pressure level;
determine a fourth maximum fan speed for the at least the second fan based at least on the second maximum acoustic sound pressure level;
provide third configuration information, which indicates the third maximum fan speed for the at least the first fan, to the fan controller of the information handling system;
provide fourth configuration information, which indicates the second maximum power consumption and the fourth maximum fan speed for the at least the second fan, to the information handling system card;
the fan controller configured to control the fan speed of the first fan based on the third configuration information; and
the information handling system card configured to control the fan speed of the second fan based on the fourth configuration information.

2. The information handling system of claim 1, wherein the fan controller is configured to operate the at least the first fan at the fan speed less than or equal to the first maximum fan speed.

3. The information handling system of claim 2, wherein the information handling system card is configured to operate the at least the second fan at the fan speed less than or equal to the second maximum fan speed.

4. The information handling system of claim 2,
wherein the processor is further configured to:
determine that a calendar event has occurred; and
in response to determining that the calendar event has occurred, determine a third maximum acoustic sound pressure level associated with operating the information handling system based at least on the calendar event, wherein the third maximum acoustic sound pressure level is less than the first maximum acoustic sound pressure level; and
wherein the embedded controller is further configured to:
determine a third maximum power consumption for the information handling system card based at least on the third maximum acoustic sound pressure level;
determine a fifth maximum fan speed for the at least the first fan based at least on the third maximum acoustic sound pressure level;
determine a sixth maximum fan speed for the at least the second fan based at least on the third maximum acoustic sound pressure level;
provide fifth configuration information, which indicates the fifth maximum fan speed for the at least the first fan, to the fan controller of the information handling system; and
provide sixth configuration information, which indicates the third maximum power consumption and the sixth maximum fan speed for the at least the second fan, to the information handling system card.

5. The information handling system of claim 4,
wherein the calendar event is associated with a length of time;
wherein the processor is further configured to determine that the length of time has passed; and
wherein the embedded controller is further configured to:
provide the first configuration information, which indicates the first maximum fan speed for the at least the first fan, to the fan controller of the information handling system; and
provide the second configuration information, which indicates the first maximum power consumption and the second maximum fan speed for the at least the second fan, to the information handling system card.

6. The information handling system of claim 1,
wherein the processor is further configured to receive second user input indicating a second maximum acoustic sound pressure level associated with operating the information handling system; and
wherein the embedded controller is further configured to:
determine a third maximum power consumption for the information handling system card based at least on the second maximum acoustic sound pressure level;
determine a fifth maximum fan speed for the at least the first fan based at least on the third maximum acoustic sound pressure level;
determine a sixth maximum fan speed for the at least the second fan based at least on the third maximum acoustic sound pressure level;
provide fifth configuration information, which indicates the fifth maximum fan speed for the at least the first fan, to the fan controller of the information handling system; and
provide sixth configuration information, which indicates the third maximum power consumption and the sixth maximum fan speed for the at least the second fan, to the information handling system card.

7. The information handling system of claim 1,
wherein, to receive the first user input, the processor is further configured to receive the first user input via a graphical user interface of an application that executes in an operating system context;
wherein the application is configured to provide information associated with the first maximum acoustic sound pressure level to information handling system firmware of the information handling system via a management information exchange; and wherein the information handling system firmware is configured to provide the first maximum acoustic sound pressure level to the embedded controller.

8. The information handling system of claim 7, wherein, to provide the first configuration information to the fan controller of the information handling system, the information handling system firmware is further configured to provide the first configuration information to the embedded controller.

9. A method, comprising:
    determining that an inventory of components of an information handling system includes at least a first fan and an information handling system card;
    determining that the information handling system card includes at least a second fan;
    receiving first user input indicating a first maximum acoustic sound pressure level associated with operating the information handling system;
    determining a first maximum power consumption for the information handling system card based at least on the first maximum acoustic sound pressure level, a current acoustic sound pressure level associated with the second fan of the information handling system card, and a current acoustic sound pressure level associated with the first fan of the information handling system at a sensor spaced-apart from the information handling system card;
    determining that a headphone plug is not inserted into a headphone jack of the information handling system, and in response:
        determining a first maximum fan speed for the at least the first fan based at least on the first maximum acoustic sound pressure level;
        determining a second maximum fan speed for the at least the second fan based at least on the first maximum acoustic sound pressure level;
        providing first configuration information, which indicates the first maximum fan speed for the at least the first fan, to a fan controller of the information handling system that controls the at least the first fan;
        providing second configuration information, which indicates the first maximum power consumption and the second maximum fan speed for the at least the second fan, to the information handling system card;
        controlling a fan speed of the first fan based on the first configuration information;
        controlling a fan speed of the second fan based on the second configuration information;
    determining that the headphone plug is inserted into the headphone jack of the information handling system, and in response:
        determining a second maximum acoustic sound pressure level associated with operating the information handling system, wherein the second maximum acoustic sound pressure level is greater than the first maximum acoustic sound pressure level;
        determining a second maximum power consumption for the information handling system card based at least on the second maximum acoustic sound pressure level, the current acoustic sound pressure level associated with the second fan of the information handling system card, and the current acoustic sound pressure level associated with the first fan of the information handling system at the sensor spaced-apart from the information handling system card;
        determining a third maximum fan speed for the at least the first fan based at least on the second maximum acoustic sound pressure level;
        determining a fourth maximum fan speed for the at least the second fan based at least on the second maximum acoustic sound pressure level;
        providing third configuration information, which indicates the third maximum fan speed for the at least the first fan, to the fan controller of the information handling system;
        providing fourth configuration information, which indicates the second maximum power consumption and the fourth maximum fan speed for the at least the second fan, to the information handling system card;
        controlling the fan speed of the first fan based on the third configuration information; and
        controlling the fan speed of the second fan based on the fourth configuration information.

10. The method of claim 9, further comprising:
    operating the at least the first fan at the fan speed less than or equal to the first maximum fan speed.

11. The method of claim 10, further comprising:
    operating the at least the second fan at the fan speed less than or equal to the second maximum fan speed.

12. The method of claim 10, further comprising:
    determining that a calendar event has occurred;
    in response to the determining that the calendar event has occurred, determining a third maximum acoustic sound pressure level associated with operating the information handling system based at least on the calendar event, wherein the third maximum acoustic sound pressure level is less than the first maximum acoustic sound pressure level;
    determining a third maximum power consumption for the information handling system card based at least on the second maximum acoustic sound pressure level;
    determining a fifth maximum fan speed for the at least the first fan based at least on the third maximum acoustic sound pressure level;
    determining a fifth maximum fan speed for the at least the second fan based at least on the third maximum acoustic sound pressure level;
    providing fifth configuration information, which indicates the fifth maximum fan speed for the at least the first fan, to the fan controller of the information handling system; and
    providing fifth configuration information, which indicates the third maximum power consumption and the fifth maximum fan speed for the at least the second fan, to the information handling system card.

13. The method of claim 12, wherein the calendar event is associated with a length of time;
    the method further comprising:
    determining that the length of time has passed;
    providing the first configuration information, which indicates the first maximum fan speed for the at least the first fan, to the fan controller of the information handling system; and
    providing the second configuration information, which indicates the first maximum power consumption and the second maximum fan speed for the at least the second fan, to the information handling system card.

14. The method of claim 9, further comprising:
    receiving second user input indicating a second maximum acoustic sound pressure level associated with operating the information handling system;

determining a third maximum power consumption for the information handling system card based at least on the second maximum acoustic sound pressure level;

determining a fifth maximum fan speed for the at least the first fan based at least on the third maximum acoustic sound pressure level;

determining a sixth maximum fan speed for the at least the second fan based at least on the third maximum acoustic sound pressure level;

providing fifth configuration information, which indicates the fifth maximum fan speed for the at least the first fan, to the fan controller of the information handling system; and providing sixth configuration information, which indicates the third maximum power consumption and the sixth maximum fan speed for the at least the second fan, to the information handling system card.

15. The method of claim 9, wherein the receiving the first user input includes receiving the first user input via a graphical user interface of an application that executes in an operating system context;

the method further comprising:

providing information associated with the first maximum acoustic sound pressure level to information handling system firmware of the information handling system via a management information exchange;

wherein the providing the first configuration information to the fan controller of the information handling system includes the information handling system firmware providing the first configuration information to the fan controller of the information handling system; and wherein the providing the second configuration information to the information handling system card includes the information handling system firmware providing the second configuration information to the information handling system card.

16. The method of claim 15, wherein the information handling system firmware providing the first configuration information to the fan controller of the information handling system includes the information handling system firmware providing the first configuration information to an embedded controller of the information handling system, which provides the first configuration information to the fan controller of the information handling system.

* * * * *